(73.)

DAVID OSBORN.
Improvement in Soil Pulverizer.

No. 122,643.

Patented Jan. 9, 1872.

Witnesses:
E. Wolff.
Geo. W. Mabee

Inventor:
D. Osborn
Per Munn & Co
Attorneys.

UNITED STATES PATENT OFFICE.

DAVID OSBORN, OF PAOLI, INDIANA.

IMPROVEMENT IN SOIL-PULVERIZERS.

Specification forming part of Letters Patent No. 122,643, dated January 9, 1872.

Specification describing a new and improved Soil-Pulverizer invented by DAVID OSBORN, of Paoli, in the county of Orange and State of Indiana.

Figure 1:
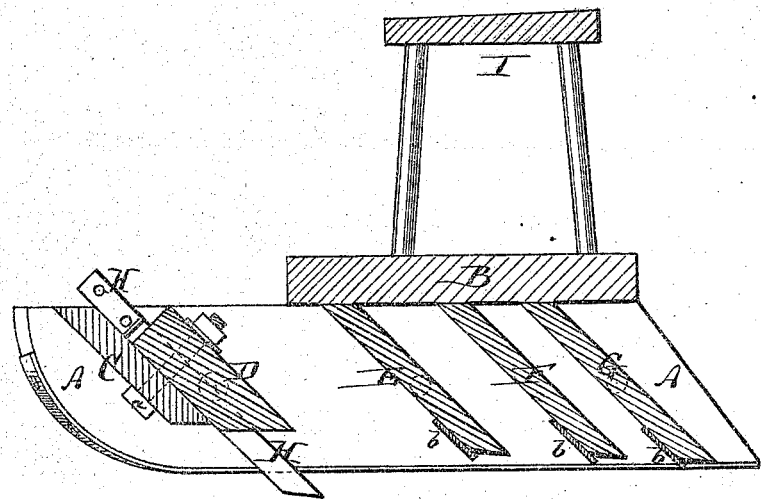
Figure 2:
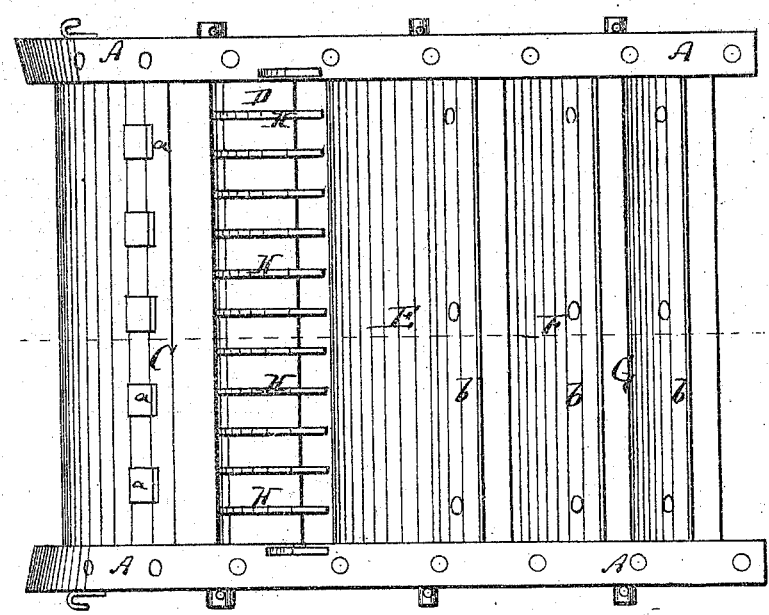

Figure 1 represents a vertical longitudinal section of my improved soil-pulverizer and corn-coverer. Fig. 2 is a bottom view of the same.

Similar letters of reference indicate corresponding parts.

This invention relates to a new agricultural machine which is intended to combine the functions of the harrow and land-roller—i. e., to pulverize and level the soil. It is intended for use, principally subsequent to sowing, to cut the clods and cover the grains. The invention consists in the general new arrangement of sled, adjustable pulverizing tools, and graduated ground-coverers.

A A are the side pieces or runners of the sled, their front ends being rounded and made slightly flaring, as shown, so that they will crowd the ground between them. Their running edges are armed with metal to increase their durability. The two runners are held apart and connected by a top-board, B, and by a series of inclined transverse beams C, D, E, F, and G. These latter are so inclined that their upper portions are further forward than their lower, as shown. The two front beams C and D are close together. Between them are held the inclined clod-cutters H H, which are plain metallic blades fitted into slots of the beam D. Bolts $a$ $a$ and nuts draw the two beams C D firmly together and hold the cutters H at the desired elevation. When these bolts are slackened the cutters can be set more up or down and then refastened. They are thus properly adjustable to the nature of the soil. The beams E F G are behind the clod-cutters and graduated—i. e., the one most forward reaches less far down than the next, and that less than the third, as shown. Their faces are preferably armed with strap-iron, $b$.

When the machine is drawn over a field the blades H will first cut the clods, and the beams E F G will then gradually and successively level the earth and smooth it down, breaking meanwhile the clods still further.

A driver's seat, I, is supported on the board B, the weight of the driver thus aiding in the proper execution of the work. Instead of three beams E F G, there may be more or less on one machine.

Having thus described my invention, I claim as new and desire to secure by Letters Patent—

The combined pulverizer and coverer composed of the runners A A, beams C D E F G, and adjustable clod-cutters H H, substantially as herein shown and described.

DAVID OSBORN.

Witnesses:
  JOHN R. PATTON,
  WILLIAM FARRELL.